(12) United States Patent
Padwekar et al.

(10) Patent No.: US 7,272,736 B2
(45) Date of Patent: Sep. 18, 2007

(54) METHOD AND SYSTEM FOR FAST FREQUENCY SWITCH FOR A POWER THROTTLE IN AN INTEGRATED DEVICE

(75) Inventors: Kiran Padwekar, San Jose, CA (US); Arvind Mandhani, Washington, DC (US); Durgesh Srivastava, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 10/794,735

(22) Filed: Mar. 3, 2004

(65) Prior Publication Data

US 2005/0198544 A1 Sep. 8, 2005

(51) Int. Cl.
*G06F 1/32* (2006.01)

(52) U.S. Cl. .................................. 713/322; 713/323
(58) Field of Classification Search .................. None
See application file for complete search history.

(56) References Cited

U.S. PATENT DOCUMENTS

| | | | | |
|---|---|---|---|---|
| 5,485,602 A * | 1/1996 | Ledbetter et al. | ........... | 713/600 |
| 5,787,294 A * | 7/1998 | Evoy | ........................... | 713/320 |
| 6,367,023 B2 * | 4/2002 | Kling et al. | ................. | 713/340 |
| 6,457,135 B1 * | 9/2002 | Cooper | ....................... | 713/323 |
| 6,636,980 B1 * | 10/2003 | Gervais et al. | ............. | 713/600 |

* cited by examiner

*Primary Examiner*—Thuan N. Du
(74) *Attorney, Agent, or Firm*—Trop, Pruner & Hu, P.C.

(57) ABSTRACT

The ability to change from a first bus ratio to a second bus ratio without draining the transaction queues of a processor.

21 Claims, 4 Drawing Sheets

METHOD AND SYSTEM FOR FAST FREQUENCY SWITCH FOR A POWER THROTTLE IN AN INTEGRATED DEVICE

BACKGROUND

1. Field

This disclosure generally relates to power reduction with a throttle.

2. Background Information

The demand for more powerful computers and communication products has resulted in faster processors that often have higher die temperatures and consume increasing amounts of power. However, design engineers struggle with reducing power consumption and die temperature.

Typically, a processor or microcontroller will utilize a clock multiplier. The clock multiplier is a ratio of a core frequency of the processor over a bus frequency. One typical solution is a throttle for changing the clock multiplier. For example, as the operating temperature of the integrated device rises, the operating frequency is reduced. Consequently, the integrated device cools down due to the lower operating frequency. Therefore, the operating frequency may be increased after the integrated device had cooled down. However, this throttle may have a detrimental impact on the processor's performance because the processor suffers from the long latency involved in switching the clock multiplier.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in details so as not to obscure the claimed subject matter.

An area of current technological development relates to achieving longer battery life for communication products and computer or computing systems by reducing power consumption. Typically, as the processor operates at a higher temperature, the performance of the transistors for the processor may degrade and become slower. Presently, a throttle is utilized to reduce power consumption and die temperature by reducing the operating frequency. However, as previously discussed, a throttle has a detrimental impact on performance of an integrated device, such as a processor, because the processor may halt execution of all instructions and drain or stall the processor queues. Consequently, this results in the processor grinding to a halt. Thus, a typical throttle is analogous to "slamming on the car brakes" to cause the car (processor) to grind to a halt when trying to reduce the power consumption while changing a clock multiplier. As previously mentioned, a core frequency for the processor or integrated device is derived by multiplying a bus frequency by a clock multiplier. In one embodiment, the bus frequency is for a front side bus and is fixed and the clock multiplier is user-specified.

In contrast to a typical throttle, the claimed subject matter facilitates a system and a method that facilitates switching the clock multiplier to reduce the core frequency while precluding the draining or halting of the processor queues because the frequency switch occurs in a few core clocks and is transparent to the user. The claimed subject matter is described in the following detailed description.

Figure 1:
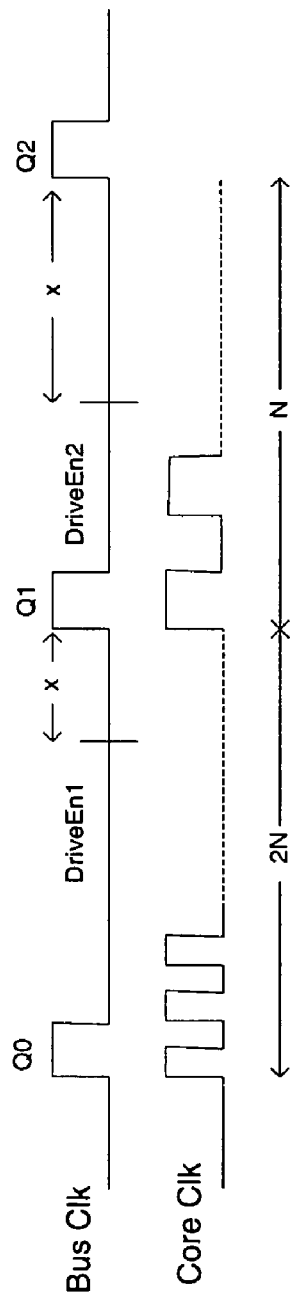
FIG. 1 is a timing diagram illustrating an embodiment of generating drive enable signals in accordance with the claimed subject matter.
Figure 2:
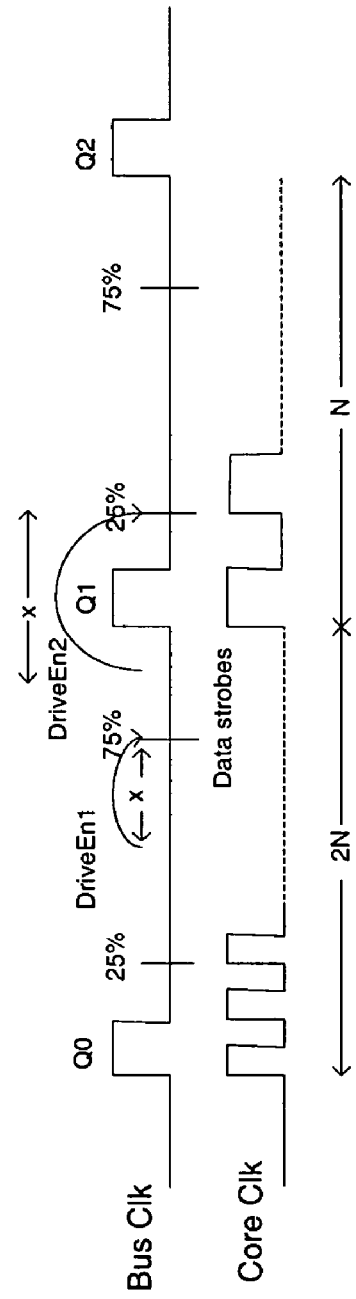
FIG. 2 is a timing diagram illustrating an embodiment of generating strobe drive/sample enable signals in accordance with the claimed subject matter.

In one aspect, the claimed subject matter teaches a clock counter algorithm for generating drive enable and strobe generation signals, as depicted in connection with FIGS. 1 and 2. The clock counter algorithms may be may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Figure 3:
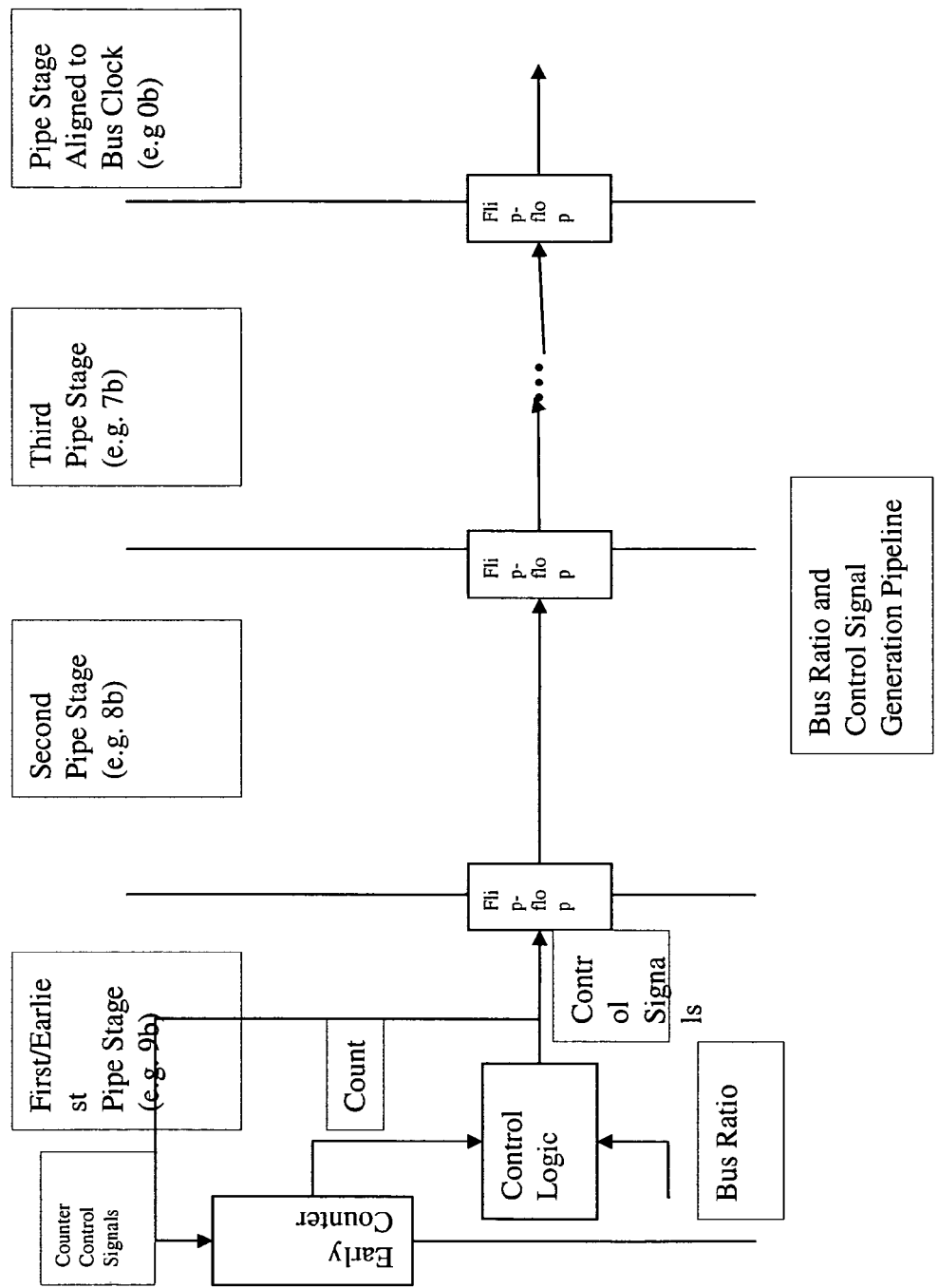
FIG. 3 is a block diagram for bus ratio and control signal generation pipeline as utilized by an embodiment.

In another embodiment, the claimed subject matter facilitates pipelining of bus control signals and Phase Locked Loop (PLL) switch swings to support arbitrary depth for accommodating larger propagation delays to and from pads and for advancing the control signal ahead of the switch, for accommodating switch signal setup time with respect to PLL switch, as depicted in connection with FIG. 3.

FIG. 1 is a timing diagram illustrating an embodiment of generating drive enable signals in accordance with the claimed subject matter. In one embodiment, the claimed subject matter supports generating drive enable signals for a processor or integrated device that runs at different core frequencies. In one embodiment, the claimed subject matter interacts with a front side bus and operates at a core frequency and is functionally equivalent for a range of clock multipliers. Therefore, each signal adheres to latency requirements for driving a signal on to the bus clock and includes driving signals at a predetermined times before a subsequent rising edge of a bus clock. Therefore, this facilitates the logic for the claimed subject matter of being independent of a clock multiplier for a minimum latency that is chosen based on the highest supported clock multiplier.

As previously mentioned, a processor or integrated device may support a range of clock multipliers. Typically, a set of synchronization signals, such as, drive enables and sample enables are utilized as synchronization signals. The drive enable signals are utilized for driving signals on to a bus, such as, a front side bus and the sample enable signals are utilized for sampling an incoming signal from a bus, such as, a front side bus.

In one embodiment, the sample enable signals can be derived from and are symmetrical with respect to the drive enables. In one embodiment, the sample enable signals are used after the rising edge of the bus clock. For example, to generate a sample enable 1 cycle after the bus clock, the drive enable signal is delayed by x+1 cycles. In one embodiment, the following is coded into Register Transfer Language (RTL) as follows:

For x=2
DFF(coreClk, drive_enable_2_before, drive_enable_1_before)
DFF(coreClk, drive_enable_1_before, drive_enable_aligned_with_bus_clk)
DFF(coreClk, drive_enable_aligned_with_bus_clk, sample_enable_1_after_bus_clk)

The following example illustrates the timing for generating a drive signal for a clock multiplier based on a clock counter. As previously described, there are latency requirements for driving a signal on to the bus clock. Assuming the latency requirement (x−1) core clocks, consequently, there is (x) number of core clocks before a rising edge of the next bus clock. Also, assuming the clock multiplier is (N), this results in the drive enable signal being asserted x number of core clocks before the rising edge of the next bus clock and (N−x) clocks after the trailing edge. In contrast, assuming the clock multiplier is (2N), the relative distance in clock clocks is the same from a leading edge of the bus clock, however, the distance from the trailing edge is (2N−x).

In one embodiment, the fixed positioning of the drive enable for a range of clock multipliers is calculated based at least in part on a clock counter. The calculation (operation) of the clock counter is:

For every rising edge of a core clock, the counter=if (reset) {init_constant}
else if (!counter) {reload_constant}
else (counter−1)
drive$_{13}$_enable=1 when counter=0

The preceding operation of the clock counter depicts a nested loop to assign different values for the counters based on decisions. For example, the counter would be set to the same value of init_constant if the value of reset is a logic one. Otherwise, the counter would be set to the same value of reload_constant if the value of counter is a logic zero. If the value of counter is not equal to a logic zero, then the counter value is decremented by one.

Finally, the drive_enable value is set to a logic one if the counter value is zero.

For further explanation on the variables, in one embodiment, the init_constant variable defines an initial shift for a specific clock multiplier. For example, for a clock multiplier of 10, a drive enable signal that is true (valid) 2 core clock cycles before a bus clock will have an init_constant value of 8; likewise, for a clock multiplier of 14, a drive enable signal that is true (valid) 2 core clock cycles before a bus clock will have an init_constant value of 12. In the same embodiment, the reload_constant value will be equal to the clock_multiplier.

In order to support a power throttle, one needs to change the clock multiplier value. Therefore, the drive enable signal needs to be generated for a different clock multiplier value. Furthermore, the init_constant and reload_constant have to reflect the new clock multiplier value. Consequently, the init_constant and the reload_constant variables are re-initialized for the new clock multiplier value before the counter is restated. For example, in one embodiment, the drive enable is generated for the new clock multiplier value when the frequency switch is expect in the next bus cclye. Therefore, the init_constant and the reload_constant variables are reinitialized by modifying the earlier counter algorithm as follows:

For every edge of a core clock, the counter=if (reset) {init_constant}
else if (!counter && switch_freq_next_bus_clock) {reload_constant_new}
else if (!counter) {reload_constant}
else {counter−1}
drive_enable=1 when counter=0

The preceding operation of the clock counter depicts a nested loop to assign different values for the counters based on decisions. For example, the counter would be set to the same value of init_constant if the value of reset is a logic one. Otherwise, the counter would be set to the same value of reload_constant_new (to reflect the new clock multiplier value) if the value of Boolean function (&& is a Logical AND) of not counter and the switch_freq_next_bus_clock is a logic one. Otherwise, if the Boolean function is a logic zero and the counter value is a logic zero, then the counter is set to a value of the reload_constant value. Otherwise, then the counter value is decremented by one.

Finally, the drive_enable value is set to a logic one if the counter value is zero.

FIG. 1 depicts one example of a power throttle since the clock multiplier is reduced from 2N to N. A drive enable (DriveEn1) is for the clock multiplier of 2N, in contrast, a drive enable (DriveEn2) is for the clock multiplier of N. The DriveEn1 is (x) core clocks away from a bus clock Q1. With the assumption the that frequency switch occurs at a rising edge of bus clock Q1, the DriveEn2 is (N−x) core clock cycles away from the rising edge of bus clock Q1. When DriveEn1 is generated, the counter is loaded with the number of core clocks before the next drive enable (DriveEn2) is generated. In one embodiment, the number of core clocks is 2N. However, because of the frequency switch, the number would be (x+N−x), which is N. Therefore, regardless of the number, the counter is loaded with a new multiplier value when there is a frequency switch in the next bus clock cycle.

The claimed subject matter is not limited to the previous example of a power throttle that reduces the clock multiplier from 2N to N. In contrast, the claimed subject matter supports increasing the clock multiplier. Likewise, the claimed subject matter supports different values of clock multipliers.

FIG. 2 is a timing diagram illustrating an embodiment of generating strobe drive/sample enable signals in accordance with the claimed subject matter. In one embodiment, the strobe signal runs at twice the bus clock frequency and is utilized for latching bus data signals. For example, the bus data signals may be front side bus (FSB) data signals. In the same embodiment, the strobe signals are generated at 25% and 75% of the bus clock duty cycle (as illustrated on the vertical lines at 25% and 75% for both drive enable signals, DriveEn1 and DriveEn2 on the bus clock timing). As previously described in connection with FIG. 1, a drive enable (DriveEn1) is for the clock multiplier of 2N, in contrast, a drive enable (DriveEn2) is for the clock multiplier of N. DriveEn1 is generated x core clock cycles before the 75% strobe, while the next strobe generated is for the 25% of the next bus period with a multiplier of N (as illustrated by the semicircular arc label 202). Therefore, the distance between the two strobes is: (0.25) multiplied by (2N) (during the DriveEn1 time period with a clock multiplier of 2N)+0.25N (during the DriveEn2 time period with a clock multiplier of N). Furthermore, in one embodiment, the reload constant equation is:

reload_constant_new_for_strobes=0.25(times)(current multiplier)+0.25(times)(next_multiplier).

However, the claimed subject matter is not limited to strobe values at 25% and 75% of a duty cycle for a bus clock. The claimed subject matter supports any combination of strobe values by altering the strobe settings and changing the reload constant equation to reflect the different strobe values.

FIG. 3 is a block diagram for bus ratio and control signal generation pipeline as utilized by an embodiment. The block diagram facilitates generating control signals based at least in part on the desired bus ratio and counters. Therefore, it supports an arbitrary range of bus ratios and switches from a first bus ratio to another.

The block diagram comprises an early counter, PLL control logic and a plurality of pipe stages. The PLL control logic receives the count from the output of the early counter.

The early counter receives counter control signals from an output of the control logic. The early counter for the current bus ratio is maintained sufficiently ahead of the PLL ratio counter. The early counter is used to count core clocks in the first (earliest) pipe stage. For example, the early counter counts from zero to (1 less than the bus ratio). The counter resets to zero on the next clock after reaching (bus ratio−1). Therefore, the control signals from the PLL control logic are generated by comparing the count from the early counter to various counts derived from the bus ratio and staging the match along the pipeline to the appropriate pipe stage.

In one embodiment, the number of stages in the pipeline is based at least in part on the earliest control signal that needs to be generated. For example, if a bus ratio needs to be switched from 7 to 28, then the earliest control signal is generated 9 core clocks before the bus clock edge. Therefore, a 10 stage pipeline is utilized with the stages depicted as $9b$, $8b$, . . . , and finally $0b$. In this embodiment, the earliest pipe stage is depicted as $9b$. As previously described, the early counter counts the core clocks in the earliest pipe-stage, in this example the earliest pipe stage is $9b$. Therefore, if a bus ratio is 7, the early counter counts from 0 to 6 and back to 0.

The bus relative signals are derived by comparing the early counter value to a value that is computed from the bus ratio. For example, if a strobe is required at 50% bus clock, the early counter value is compared to 50% of the bus ratio, which is a arithmetic shift right operation. Likewise, the arithmetic shift handles both odd and even bus ratios. Therefore, the claimed subject matter supports odd and even bus ratios. Back to the example of a bus ratio of 7, the early counter value is compared to 3 (since this is the result of the arithmetic shift right operation of 7>>1) in stage $9b$, which is nine core clocks before the bus clock. Consequently, the early counter value will be equal to three exactly nine core clocks before the 50% of the bus clock and the $9b$ signal (a signal that is 9 clocks before the bus clock) is staged for as many clocks as needed for generating a signal an arbitrary number of clocks before or after the 50% of bus clock.

The early counter value is reset to zero when receiving a request for changing from a first bus ratio to a second bus ratio (a frequency change). Consequently, the early counter value switches to a new count when the frequency switch is generated. For example, the switch signal is also generated in the earliest pipe stage when the early counter value reaches one less than when the count reaches 1 less than the bus ratio if the clock tooth stealing is disabled, and 2 less than the bus ratio if the clock tooth stealing is enabled. In the event the switch signal is generated, the early counter value resets to 0 on the next clock and starts counting to the switched bus ratio (second bus ratio). In the example above, when switching from 7 to 28 with clock tooth stealing, the Switch signal is generated when the counter reaches 5 (1 less than the normal count of 0 to 6). On the next clock, the counter resets to 0, and starts counting from 0 to 27 for a bus ratio of 28. When changing the bus ratio, multiplex between 2 PLLs and switch between them. As a result of the PLL switch, there is a slight delay in the first clock cycle after the switch between PLLs. For example, the first clock cycle may be delayed anywhere for at least few picoseconds. In contrast, the clock tooth stealing allows for elongating the first clock to compensate for this delay. For example, the first clock cycle may be longer than a normal single clock cycle and less than two normal clock cycles. As previously described, the claimed subject matter supports control signal generation with or without clock tooth stealing.

In one embodiment, the Switch signal is propagated to the PLL control logic by staging it till it reaches the bus clock edge (9 clocks in our example). On the bus clock edge, the core clock is switched from the current bus ratio to the requested bus ratio. The Early Counter similarly makes it possible to generate control signal an arbitrary number of bus clocks before the switch.

In one embodiment, the block diagram may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone).For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Likewise, RTL code that may be used to implement the functionality previously described. The RTL code is a building block to facilitate the synthesis of the hardware functions and is not transparent to the end product.

For example, the software may be coded as follows. Please note that comments are inserted to clearly articulate the values of the variables and the function of each code. Likewise, each comment starts with a ! in the first character on the line.

```
!===========================================================
!           2 bus ratios are modeled ratio0 and ratio1.
!           Ratio represents the current bus ratio. Current selects the ratio.
ratio := CASE current OF BEGIN
              ['1] ratio1;
              ['0] ratio0;
         END;
```

-continued

```
!               Cclk is the core clock, bclk the bus clock.
!               Bck has the bus clock frequency, and is high for 1 clock.
vDFF(cclk, bclk, bclkdel);
bck := bclk AND NOT bclkdel;
!               Ratio0/1 are initialized to pocratio on bus reset
!               Pocratio (Power On Clear Ratio) captured from the bus
vEDFF(qclkebl, fsbresetinc00h, pocratio, ratio0);
vEDFF(qclkebl, fsbresetinc00h, pocratio, ratio1);
!===========================
!               Pocratio initialized to ratio captured from the bus, unless
!               it is below or above the supported range, in which case it is
!               initialized to default ratio.
pocratio := CASE (EblQValC00B[4:0]) OF BEGIN
            ['000__]                    $cvn(8);
            ['0010__]                   $cvn(8);
            ['11111]                    $cvn(8);
            []                          EblQValC00B;
END;
!               Ratio24 represents 2/4$^{th}$ (i.e. half) of ratio
!               Lastcount is the last value the counter counts before reseting to 0
!               Syncount is the value used to synchronize the counter to the bus for
!               various bus ratios when bus is reset.
!               count1 is count plus 1, used for incrementing the counter
!               Request is the bus ratio request. 1 indicates request to use ratio1.
!               whereas 0 indicates request to use ratio0.
ratio24 := '0 & ratio[4:1];
lastcount := ratio - '00001;
synccount := CASE ratio OF BEGIN
            ['00110]                    '00100;
            ['00111]                    '00011;
            ['01000]                    '00010;
            ['01001]                    '00001;
            ['01010]                    '00000;
            []                          '01010;
END;
count1 := count + '00001;
vEDFF(cclk, fsbresetinc00h, '0, request);
!               sync is a synchronizing strobe that initializes the counter to the
!               correct count, synccount, for all bus ratios.
!               Switchnext indicates that the early counter will switch the bus ratio
!               on the next clock. This happens when the requested ratio is different
!               from current ratio, and the incremented count equals last count.
!               Resetnext indicates that the early counter will reset to 0 on the
!               next clock. This happens when the incremented count equals (current) ratio.
sync := fsbresetinc00h AND bck;
switchnext := (request XOR current) AND vBAND(count1 XNOR lastcount);
resetnext := vBAND (count1 XNOR ratio);
!               state machine to generate next values of current and count for various
!               values of sync, switchnext and resetnext.
!               When sync is 1, i.e. on reset, current stays unchanged, and count
!               (i.e. counter) gets the approapriate sync count.
!               When switchnext is 1, i.e. the ratio needs to be switched on the
!               next clock, the request is assigned to next current, i.e. the requested
!               ratio is assigned to next current ratio; and the next count is reset to 0
!               When resetnext is 1; i.e. the counter has reached the last count for
!               the current ratio, and needs to be reset; the current ratio remains
unchanged
!               and count is reset to 0.
!               In all other cases, the current ratio remains unchanged, and the
!               counter counts up.
nextcurrent & nextcount := CASE sync & switchnext & resetnext OF BEGIN
            ['1__]                      current & synccount;
            ['01__]                     request & '00000;
            ['001]                      current & '00000;
            []                          current & count1;
END;
!               Next values of count, switch and current are flopped; i.e. next states
!               assigned to current states.
vRSDFF(cclk, '0, nextcount, count);
vRSDFF(cclk, '0, switchnext, switch);
vRSDFF(cclk, '0, nextcurrent, current);
!               Switch9b is switch signal 9 clock before (b for before) the actual ratio
switch
!               Current9b is the value of current 9 clocks before the switch.
!               Ssdrive9b is a control signal 9 clocks ahead of the 50% of bus clock. It
works
!               through ratio switch.
```

```
switch9b := switch;
current9b := current;
ssdrive9b := vBNOR(count) OR vBAND(count XNOR ratio24);
!         staging of switch signal from 9 clocks before switch to 0 before switch
vRSDFF(cclk, fsbresetinc00h, switch9b, switch8b);
vRSDFF(cclk, fsbresetinc00h, switch8b, switch7b);
vRSDFF(cclk, fsbresetinc00h, switch7b, switch6b);
vRSDFF(cclk, fsbresetinc00h, switch6b, switch5b);
vRSDFF(cclk, fsbresetinc00h, switch5b, switch4b);
vRSDFF(cclk, fsbresetinc00h, switch4b, switch3b);
vRSDFF(cclk, fsbresetinc00h, switch3b, switch2b);
vRSDFF(cclk, fsbresetinc00h, switch2b, switch1b);
vRSDFF(cclk, fsbresetinc00h, switch1b, switch0b);
!         staging of current signal from 9 clocks before switch to 0 before switch
vRSDFF(cclk, fsbresetinc00h, current9b, current8b);
vRSDFF(cclk, fsbresetinc00h, current8b, current7b);
vRSDFF(cclk, fsbresetinc00h, current7b, current6b);
vRSDFF(cclk, fsbresetinc00h, current6b, current5b);
vRSDFF(cclk, fsbresetinc00h, current5b, current4b);
vRSDFF(cclk, fsbresetinc00h, current4b, current3b);
vRSDFF(cclk, fsbresetinc00h, current3b, current2b);
vRSDFF(cclk, fsbresetinc00h, current2b, current1b);
vRSDFF(clke, fsbresetinc00h, current1b, current0b);
!         staging of ssdrive signal from 9 clocks before switch to 0 before switch.
vRSDFF(cclk, fsbresetinc00h, ssdrive9b, ssdrive8b);
vRSDFF(cclk, fsbresetinc00h, ssdrive8b, ssdrive7b);
vRSDFF(cclk, fsbresetinc00h, ssdrive7b, ssdrive6b);
vRSDFF(cclk, fsbresetinc00h, ssdrive6b, ssdrive5b);
vRSDFF(cclk, fsbresetinc00h, ssdrive5b, ssdrive4b);
vRSDFF(cclk, fsbresetinc00h, ssdrive4b, ssdrive3b);
vRSDFF(cclk, fsbresetinc00h, ssdrive3b, ssdrive2b);
vRSDFF(cclk, fsbresetinc00h, ssdrive2b, ssdrive1b);
vRSDFF(cclk, fsbresetinc00h, ssdrive1b, ssdrive0b);
```

Figure 4:
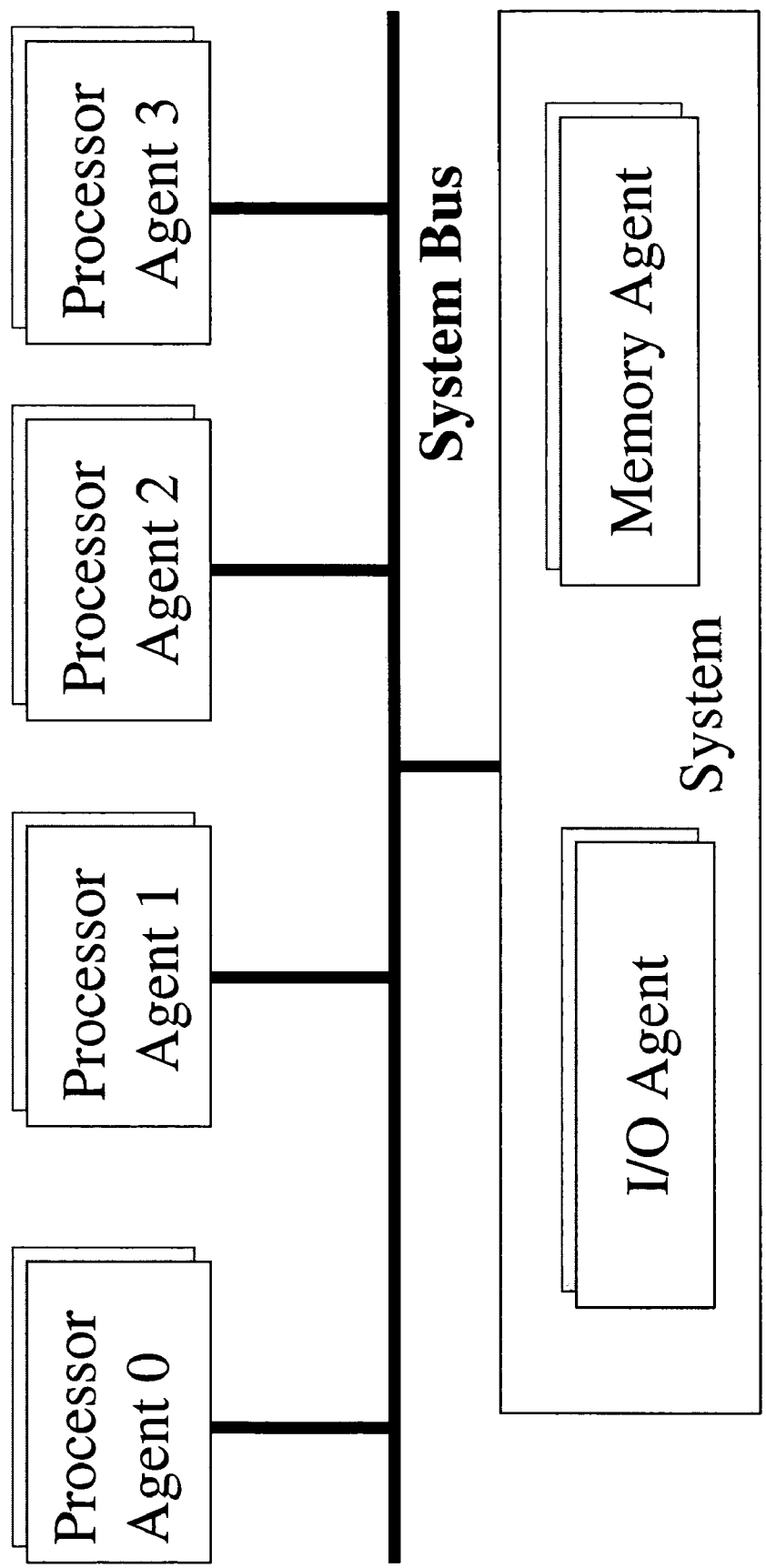
FIG. 4 is a system diagram illustrating a system that may employ the embodiment of either FIG. 1 or FIG. 2 or FIG. 3, or any combination of them.

FIG. 4 is a system diagram illustrating a system that may employ the embodiment of either FIG. 1 or FIG. 2 or FIG. 3, or any combination of them. The multiprocessor system is intended to represent a range of systems having multiple processors, for example, computer systems, real-time monitoring systems, etc. Alternative multiprocessor systems can include more, fewer and/or different components. In certain situations, the control signal generation described herein can be applied to both single processor and to multiprocessor systems.

The system bus is a multiprocessing interface to processors, memory and I/O. Up to four processors (agents three to zero) may be gutlessly interconnected on the system bus. In one embodiment, these agents are bus masters. The interface to the rest of system is represented by the high-speed I/O interface and memory interface block. Bus agents issue transactions to transfer data and system information. Each transaction has several phases that may include arbitration phase, request phase, snoop phase, response phase and a data phase.

Figure 5:
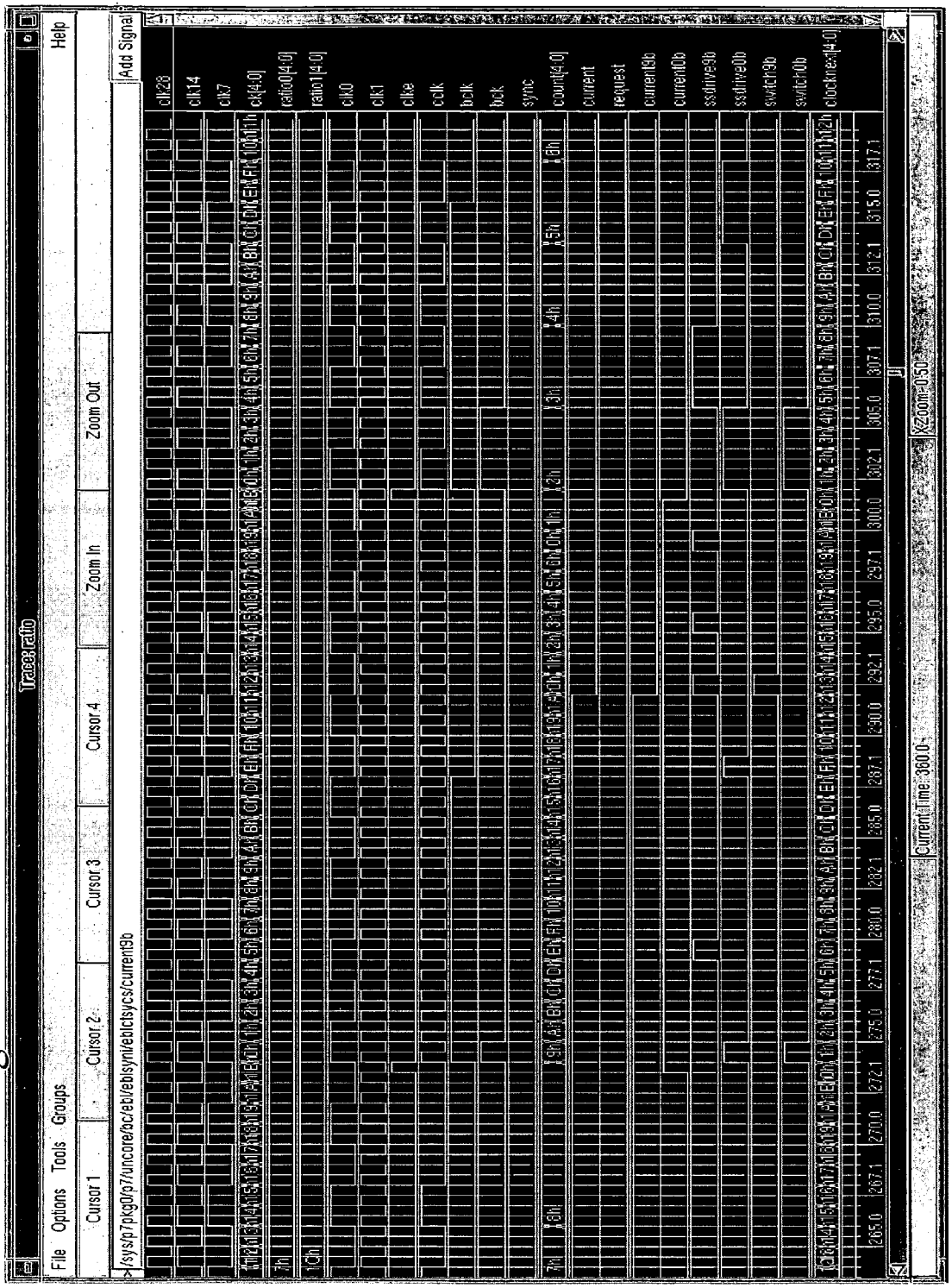
FIG. 5 is a simulation as utilized by an embodiment.

FIG. 5 is a simulation as utilized by an embodiment. One skilled in the art understands the simulation output which depicts the previously discussed example of switching the bus ratio from 7 to 28 and back to 7 while enabling clock tooth stealing. Therefore, the simulation indicates a working example of the claimed subject matter.

For more detailed information on the simulation, there are two PLLs generating clk0 and clk1, based on ratio0 and ratio1, have been modeled. Ratio0 and ratio1 can be set to 7, 14 or 28 to demonstrate how the logic works. In the simulation the ratio0 and clk0 are 7, ratio1 and clk1 are 28. The current core clock is cclk. The current bus clock is bclk. Bck is active for the entire first cclk of the bclk. Request is the signal which requests the ratio, current is the signal that indicates the current ratio. When request is different from current, frequency switch is made. Request can be toggled anytime. Both request and current signals are 9 clocks before the bus clock. Current 9b, ssdrive 9b and switch 9b are the signals 9 clocks before bclk. They are staged to generate 8b, 7b, all the way to 0b signals. Current is the current bus ratio, ssdrive is the source synchronous drive signal, switch indicates switch of frequency. The signals can be staged further to generate signals n clocks after bclk.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for generating a bus control signal when switching from a first bus ratio to a second bus ratio comprising:
   generating the bus control signal x core clocks before a bus clock edge for the first bus ratio;
   staging a plurality of (x+1) pipeline stages, wherein the first pipeline stage is x core clocks before the bus clock edge for the first bus ratio and the last pipeline stage is zero core clocks before the bus clock edge for the first bus ratio;
   incrementing a counter from zero to one less than the first bus ratio; and
   comparing the counter to a value computed from the first bus ratio.

2. The method of claim 1 wherein the value is computed from the first bus ratio based at least in part on when a strobe is to occur with respect to a percentage of the bus clock for the first bus ratio.

3. The method of claim 2 wherein the value is computed by performing an arithmetic shift right operation on the first bus ratio.

4. A method comprising:
generating a bus control signal when switching from a first bus ratio to a second bus ratio x core clocks before a bus clock edge for the first bus ratio;
staging a plurality of (x+1) pipeline stages, wherein the first pipeline stage is x core clocks before the bus clock edge for the first bus ratio and the last pipeline stage is zero core clocks before the bus clock edge for the first bus ratio;
incrementing a counter from zero to one less than the first bus ratio;
comparing the counter to a value computed from the first bus ratio; and
staging the bus control signal from the first pipeline stage for as many clocks as needed for generating a second signal an arbitrary number of clocks before or after a predetermined percentage of the bus clock for the first bus ratio.

5. The method of claim 4 wherein the value is computed from the first bus ratio based at least in part on the predetermined percentage of the bus clock for the first bus ratio, which is a strobe with respect to a percentage of the bus clock for the first bus ratio.

6. The method of claim 5 wherein the value is computed by performing an arithmetic shift right operation on the first bus ratio.

7. The method of claim 5 wherein the counter resets to zero upon receiving a request to change from the first bus ratio to the second bus ratio.

8. A method for generating a bus control signal when switching from a first bus ratio to a second bus ratio comprising:
generating the bus control signal x core clocks before a bus clock edge for the first bus ratio;
staging a plurality of (x+1) pipeline stages, wherein the first pipeline stage is x core clocks before the bus clock edge for the first bus ratio and the last pipeline stage is zero core clocks before the bus clock edge for the first bus ratio; incrementing a counter from zero to one less than the first bus ratio;
comparing the counter to a value computed from the first bus ratio; and
resetting the counter to a different value to reflect the second bus ratio upon receiving a request to change from the first bus ratio to the second bus ratio.

9. The method of claim 8 wherein the value is computed from the first bus ratio based at least in part on when a strobe is to occur with respect to a percentage of the bus clock for the first bus ratio.

10. The method of claim 9 wherein the value is computed by performing an arithmetic shift right operation on the first bus ratio.

11. The method of claim 8 wherein the request to change is generated in the first pipeline stage upon the counter value reaching a value of one less than the first bus ratio.

12. An article of manufacture comprising:
a machine-readable storage medium having a plurality of machine readable instructions, wherein when the instructions are executed by a system, the instructions provide for generating a bus control signal when switching from a first bus ratio to a second bus ratio comprising:
generating the bus control signal x core clocks before a bus clock edge for the first bus ratio;
staging a plurality of (x+1) pipeline stages, wherein the first pipeline stage is x core clocks before the bus clock edge for the first bus ratio and the last pipeline stage is zero core clocks before the bus clock edge for the first bus ratio;
incrementing a counter from zero to one less than the first bus ratio; and
comparing the counter to a value computed from the first bus ratio.

13. The article of manufacture of claim 12 wherein the value is computed from the first bus ratio based at least in part on when a strobe is to occur with respect to a percentage of the bus clock for the first bus ratio.

14. The article of manufacture of claim 12 wherein the value is computed by performing an arithmetic shift right operation on the first bus ratio.

15. The article of manufacture of claim 12 wherein the machine readable instructions are coded in Register Transfer Language (RTL).

16. A system comprising:
at least one processor, with a plurality of transaction queues, to change from a first bus ratio to a second bus ratio without draining the plurality of transaction queues, wherein a bus control signal is generated x core clocks before a bus clock edge for the first bus ratio and a plurality of (x+1) pipeline stages are staged, the first pipeline stage is x core clocks before the bus clock edge for the first bus ratio and the last pipeline stage is zero core clocks before the bus clock edge for the first bus ratio; a counter is incremented from zero to one less than the first bus ratio; and
the counter is compared to a value computed from the first bus ratio.

17. The system of claim 16 wherein the value is computed from the first bus ratio based at least in part on when a strobe is to occur with respect to a percentage of the bus clock for the first bus ratio.

18. A method comprising:
generating a bus control signal when switching from a first bus ratio to a second bus ratio x core clocks before a bus clock edge for the first bus ratio;
staging a plurality of (x+1) pipeline stages, wherein the first pipeline stage is x core clocks before the bus clock edge for the first bus ratio and the last pipeline stage is (x+n) core clocks after the bus clock edge for the first bus ratio;
incrementing a counter from zero to one less than the first bus ratio; and
comparing the counter to a value computed from the first bus ratio.

19. The method of claim 18 wherein the value is computed from the first bus ratio based at least in part on when a strobe is to occur with respect to a percentage of the bus clock for the first bus ratio.

20. A method for generating a bus control signal when switching from a first bus ratio to a second bus ratio comprising:
generating the bus control signal x core clocks before a bus clock edge for the first bus ratio;

staging a plurality of (x+1) pipeline stages, wherein the first pipeline stage is x core clocks before the bus clock edge for the first bus ratio and the last pipeline stage is (x+n) core clocks after the bus clock edge for the first bus ratio;

incrementing a counter from zero to one less than the first bus ratio;

enabling clock tooth stealing; and comparing the counter to a value computed from the first bus ratio.

21. The method of claim 20 wherein the value is computed from the first bus ratio based at least in part on when a strobe is to occur with respect to a percentage of the bus clock for the first bus ratio.

* * * * *